United States Patent [19]

Masuda et al.

[11] 4,227,171
[45] Oct. 7, 1980

[54] LIQUID LEVEL SENSING MEANS

[75] Inventors: Noboru Masuda, Tokyo; Mitsuyuki Suzuki, Okazaki, both of Japan

[73] Assignees: Denki Onkyo Co., Ltd., Tokyo; Aisin Seiki Kabushiki Kaisha, Kariya, both of Japan

[21] Appl. No.: 971,878

[22] Filed: Dec. 21, 1978

[30] Foreign Application Priority Data

Dec. 23, 1977 [JP] Japan ................................. 52/156294

[51] Int. Cl.³ .......................................... H01H 35/18
[52] U.S. Cl. ................................... 338/33; 338/32 R; 307/118; 200/84 C; 200/83 L; 340/624
[58] Field of Search ............ 307/309, 118; 200/84 R, 200/84 B, 84 C, 61.2, 83 L, 81 R; 340/612, 623, 624; 73/301, 313; 361/178; 338/32 R, 32 H, 33

[56] References Cited

U.S. PATENT DOCUMENTS

| 2,927,176 | 3/1960 | Auld, Jr. | 200/87 |
| 3,368,046 | 2/1968 | Wing | 200/83 Y |
| 3,654,956 | 4/1972 | Tsubouchi | 200/84 C |
| 3,678,490 | 7/1972 | Putt | 340/623 |
| 3,896,281 | 7/1975 | Feoktistov | 340/624 |
| 3,964,079 | 6/1976 | Katagiri | 200/84 R |
| 4,006,402 | 2/1977 | Mincuzzi | 338/32 R |
| 4,125,821 | 11/1978 | Masuda | 338/32 R |

FOREIGN PATENT DOCUMENTS

| 845137 | 8/1960 | United Kingdom . |
| 1174245 | 12/1969 | United Kingdom . |
| 1251614 | 10/1971 | United Kingdom . |
| 1416940 | 12/1975 | United Kingdom . |
| 1465335 | 2/1977 | United Kingdom . |
| 1467574 | 3/1977 | United Kingdom . |
| 1484845 | 9/1977 | United Kingdom . |
| 1507692 | 4/1978 | United Kingdom . |

OTHER PUBLICATIONS

Product Engineering, Precision Electric Switches, McGraw-Hill, Jun. 1951.

Primary Examiner—Gerald P. Tolin
Attorney, Agent, or Firm—Finnegan, Henderson, Farabow, Garrett & Dunner

[57] ABSTRACT

Liquid level sensing means comprising galvano-magneto effect transducing means, magnet means for applying magnetic flux to the transducing means, switching means movable with respect to the transducing means and having an influence on the magnetic flux applied from the magnetic means to the transducing means so that an electric signal is produced by the transducing means when the switching means has passed by the transducing means from one side to the other side thereof, one of the transducing means and the switching means being held stationary, and the other being movable in accordance with a change in liquid level.

2 Claims, 7 Drawing Figures

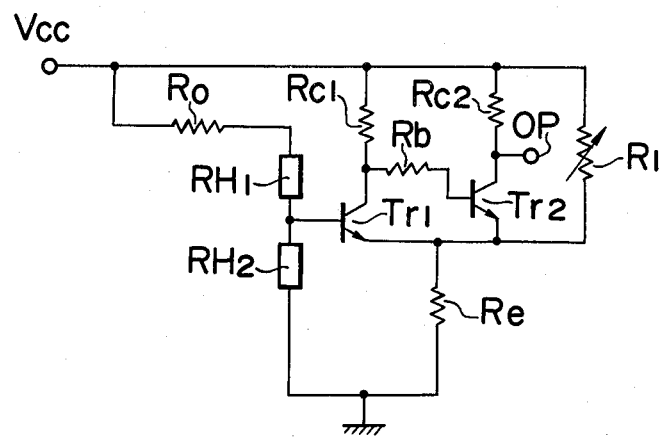

LIQUID LEVEL SENSING MEANS

The present invention relates to liquid level sensing means for detecting level of liquid such as vehicle brake oil or power transmission gear lubricating oil.

Conventionally, vehicles such as automobiles are equipped with oil level sensing means which detects that the level of lubricant oil or brake oil has decreased below a predetermined value. For example, a reed type switch is provided in an oil reservoir and adapted to be actuated by a magnet carried on a float which represents the level of oil in the reservoir. As the level of oil is lowered, the float and the magnet carried thereon are therefore moved downwards and the magnet passes by the reed switch to actuate the same. In this type of arrangement, problems have been encountered in that the reed switch is undesirably moved into the actuated position due to vibrations which the sensing means is very often subjected to during operation of the vehicles.

It is therefore an object of the present invention to provide liquid level sensing means which provides reliable indications even when it is subjected to vibrations.

Another object of the present invention is to provide liquid level sensing means having contactless switching means.

According to the present invention, in order to accomplish the above and other objects, there is provided liquid level sensing means comprising galvano-magneto effect transducing means, magnet means for applying magnetic flux to said galvano-magneto effect transducing means, switching means movable with respect to said transducing means and having an influence on the magnetic flux applied from the magnetic means to the transducing means so that an electric signal is produced by the transducing means when the switching means has passed by the transducing means from one side to the other side thereof, one of said transducing means and said switching means being held stationary, and the other being movable in accordance with a change in liquid level. In a preferable aspect of the present invention, the switching means is composed of a member made of a magnetic material which is carried on a member movable in accordance with a change in liquid level. For example, the magnetic material member may be provided on a diaphragm which separates the inside of a liquid reservoir from atmosphere. The galvanomagneto effect transducing means is then held stationary and may be composed of one or more magnetoresistive elements of which electric resistance changes in accordance with a change in the magnetic flux applied thereto. In such a case, the electric signal may be in the form of a change in the electric resistance and such resistor or resistors may be connected in an appropriate detecting circuit. According to a more preferable mode of the present invention, a pair of such magnetoresistive elements are adhesively attached to the opposite poles of the magnet means with an offset in the direction of movement of the magnetic material member, and the elements are connected in a switching circuit.

The above and other objects and features of the present invention will become apparent from the following descriptions of a preferred embodiment taking reference to the accompanying drawings, in which;

FIG. 2(A) is a sectional view showing one example of the magnetic material member;

FIG. 2(B) is a sectional view showing another example of the magnetic material member;

FIG. 3 is a plan view of the magnetic material member;

FIG. 4 is a diagrammatical view explaining the operation of the present invention;

FIG. 6 is a diagram showing an example of detecting circuit.

Figure 1:
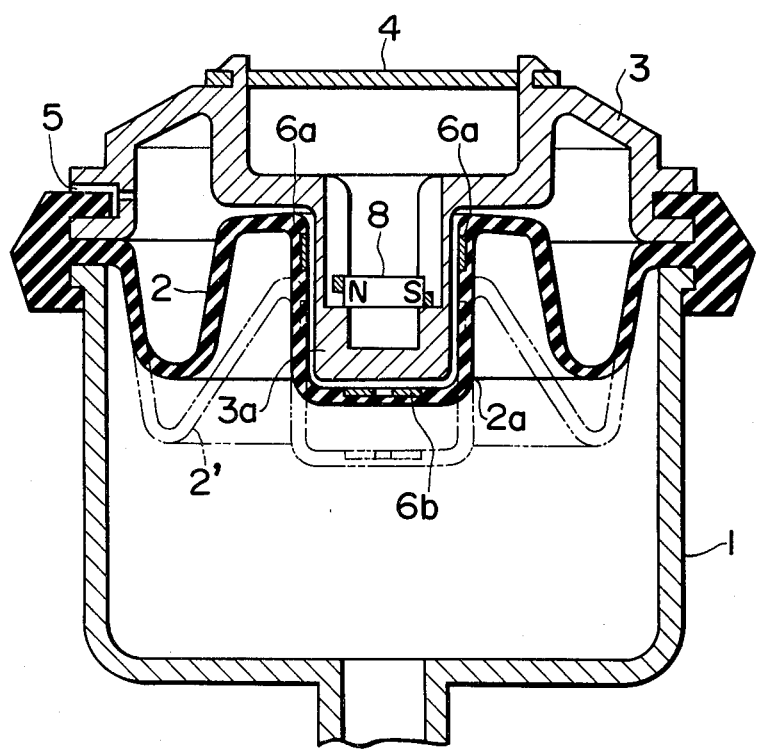
FIG. 1 is a sectional view of a liquid level sensing device in accordance with one embodiment of the present invention.

Referring to the drawings, particularly to FIG. 1, the oil level sensing device shown therein includes a reservoir 1 which is substantially of a cylindrical configuration and adapted to contain oil. At the top of the reservoir 1, there is provided a diaphragm 2 made of a rubber or a metal which is secured to the reservoir 1 by a plastic cap 3 and serves to separate the interior of the reservoir 1 from the atmosphere. The cap 3 carries a printed circuit board 4 including a detecting circuit which will be explained later in detail. A vent passage 5 is provided between the diaphragm 2 and the cap 3 so that the atmospheric pressure is introduced into the space between the parts 2 and 3 for allowing a free movement of the diaphragm 2 in accordance with the pressure in the reservoir 1.

The diaphragm 2 is formed at the center portion thereof with a cylindrical portion 2a and the cap 3 is formed with a cylindrical portion 3a which is adapted to be inserted into the cylindrical portion 2a in the diaphragm 2. In the cylindrical portion 2a of the diaphragm 2, there is provided a switching member 6 made of a magnetic material such as an iron, nickel or Pemalloy (Trade name of Western Electric). As shown in FIGS. 2(A) and 3, the switching member 6 comprises an upper annular portion 6a, a base portion 6b and connecting portions 6c which extend between the annular portion 6a and the base portion 6b. The annular portion 6a is fitted to a corresponding recess in the cylindrical wall and the base portion 6b to a corresponding recess in the bottom wall of the diaphragm cylindrical portion 2a. The switching member 6 may be embedded in the wall portion of the portion 2a. Alternatively, the base portion 6b of the switching member 6 may be secured to the bottom of the cylindrical portion 2a by means of a rivet 7 as shown in FIG. 2(B).

Figure 5:
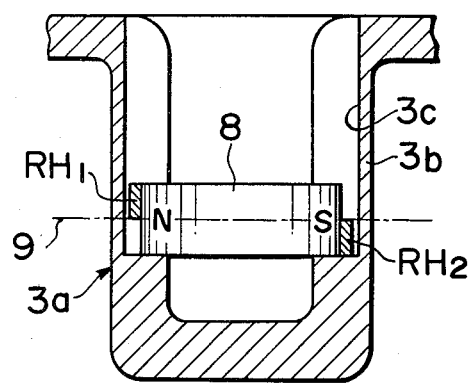
FIG. 5 is a sectional view showing an arrangement the magnet and galvano-magneto effect transducing elements.

In the cylindrical portion 3a of the cap 3, there is mounted a magnet 8 which is held in position by inserting the opposite ends thereof into vertical slits 3c formed in the inside wall surface of the cylindrical portion 3a. At the opposite ends of the magnet 8, there are adhesively attached magnetoelectric transducer elements such as magnetoresistive elements $RH_1$ and $RH_2$. The elements $RH_1$ and $RH_2$ are offset one from the other and from a center line 9 of the magnet 8 as shown in FIG. 5 in the direction parallel to the direction of movement of the diaphragm 2. The magnetoresistive elements $RH_1$ and $RH_2$ are thus covered by thin wall portions 3b in the cap cylindrical portion 3a. The wall portion 3b is useful in preventing the switching member 6 from being moved toward the elements $RH_1$ or $RH_2$ over the predetermined distance or brought into direct contact with elements $RH_1$ and $RH_2$.

Referring now to FIG. 6, it will be seen that the magnetoresistive elements $RH_1$ and $RH_2$ are connected in series between a constant voltage power source line Vcc and the ground, and a base of a first transistor $Tr_1$ is connected between a divided center of the elements $RH_1$ and $RH_2$. A fixed resistor $R_0$ is connected between the power source line Vcc and the element $RH_1$. The transistor $Tr_1$ constitutes a Schimitt trigger circuit together with a second transistor $Tr_2$ and resistors $Rc_1$, $Rc_2$, Rb and Re. For the purpose, the collector of the transistor $Tr_1$ is connected through a collector load resistor $Rc_1$ with the power source line Vcc and through the base resistor Rb with the base of the second transistor $Tr_2$. The collector of the transistor $Tr_2$ is connected with an output terminal OP and through a collector load resistor $Rc_2$ with the power source line Vcc. The emitters of the transistors $Tr_1$ and $Tr_2$ are grounded through the common emitter resistor Re and through a variable and bias control resistor $R_1$ with the power source line Vcc. Resistor $R_1$ is able to control the emitter potential of the transistors $Tr_1$ and $Tr_2$.

Since the inside of the oil reservoir 1 is separated from the atmosphere by the diaphragm 2 and the space between the diaphragm 2 and the cap 3 is opened to the atmosphere through the vent passage 5, the pressure in the reservoir 1 is changed in accordance with a change in the level of oil in the reservoir 1 and the diaphragm 2 is moved accordingly. For example, as the oil level decreases, the diaphragm 2 is moved downwards as shown by phantom lines 2′ in FIG. 1. Thus, the switching member 6 is moved downwards together with the cylindrical portion 2a of the diaphragm 2.

When the reservoir 1 is filled with oil, the diaphragm 2 is in a position shown by solid lines in FIG. 1 and the switching member 6 is positioned as shown by solid lines in FIG. 4. As the oil in the reservoir decreases, the member 6 is lowered as shown by arrows in FIG. 4 passing at first by the magnetoresistive element $RH_1$ and then by the element $RH_2$ to the position shown by phantom lines in FIG. 4.

When the member 6 is in the position shown by the solid lines in FIG. 4, the magnetoresistive element $RH_1$ is subjected to more magnetic flux than the magnetoresistive element $RH_2$ so that the electric resistance of the element $RH_1$ is greater than the initial resistance of the element $RH_1$. Thus, the first transistor $Tr_1$ is in an off state at this position of the member 6. As the member 6 is lowered to the position where the annular portion 6a is substantially aligned with the magnet 8, the elements $RH_1$ and $RH_2$ are subjected to substantially the same amount of magnetic flux and, as the member 6 is moved further downwards, the element $RH_2$ is subjected to more magnetic flux than the element $RH_1$. Thus, the resistance of the element $RH_2$ becomes greater than the initial resistance of the element $RH_2$ so that the first transistor $Tr_1$ is in an on state. Then, the second transistor $Tr_2$ is turned off so that the voltage at the output terminal OP is increased. The change in the output voltage is taken out as the oil level signal.

When the annular portion 6a of the switching member 6 is moved upwards, the first transistor $Tr_1$ is turned off and the transistor $Tr_2$ is made conductive resulting in a decrease in the voltage at the output terminal OP. If the voltages at which the first transistor $Tr_1$ is turned on and off, respectively, are substantially the same, a fluctuation of oil level due to vibrations may cause repeated on-and-off operations of the transistor $Tr_1$. When it is desired to avoid such operation, the emitters of the transistors $Tr_1$ and $Tr_2$ are connected to the common emitter resistor Re to provide a hysteresis and a threshold voltage of the Schmitt trigger circuit which can be controlled by the base control resistor $R_1$. The circuit shown in FIG. 6 is formed on the circuit board 4 in FIG. 1. On the other hand the circuit may be provided on the cylindrical portion 3a of the cap 3 in an assembly with the magnet 8 and the magnetoresistive elements $RH_1$ and $RH_2$.

The arrangement shown in the drawings is preferable in that the diaphragm 2 is drawn under a negative pressure in accordance with a change in the oil level, so that a precise indication can be ensured even with a slight change in the pressure. However, the switching member may be arranged in many different ways. The arrangement in accordance with the present invention is advantageous in that it does not have any movable contacts nor any slidable parts. Further, it is possible to provide a large stroke of movement in the switching member.

The invention has thus been shown and described with reference to a specific embodiment, however, it should be noted that the invention is in no way limited to the details of the illustrated arrangement but changes and modifications may be made without departing from the scope of the appended claims.

We claim:

1. A liquid level sensing means in a liquid reservoir, said reservoir having a container base, a cap for enclosing said base, said cap having means permitting communication between said reservoir and the atmosphere, and a flexible diaphragm sealingly disposed between said cap and said base separating liquid in said reservoir from the atmosphere, said diaphragm moving responsive to the level of said liquid, said sensing means comprising:
   (a) a cylindrically-shaped extension integrally depending from said cap into a cylindrically-shaped cup formed in said diaphragm proximate its center, said extension and said cup having corresponding, cooperative dimensions;
   (b) a magnet means disposed within said cylindrical extension and a magneto-resistive element attached to each pole of said magnet means, said magneto-resistive elements being offset from each other and offset from the center line of said magnet means in a direction parallel to the movement of said diaphragm and being electrically in a circuit for effecting an electrical signal responsive to the magnetic flux applied to the magneto-resistive elements, each end of said magnet means including one said magneto-resistive element disposed in a respective vertical channel formed in the inside wall of said cylindrical extension; and
   (c) switching means including at least one switching member of magnetic material disposed on the inside wall of said cylindrical cup, said switching means being carried by said movable diaphragm such that said switching member passes proximate said magneto-resistive elements outside the wall of said cylindrical extension as the diaphragm moves in response to change in fluid level, thereby affecting the magnetic flux applied to said magneto-resistive elements.

2. The liquid level sensing means as in claim 1 also including a circuit board secured to the exterior surface of said cap, said circuit board incorporating said circuit.

* * * * *